United States Patent [19]

London, Jr. et al.

[11] E Patent Number: Re. 31,808

[45] Reissued Date of Patent: Jan. 22, 1985

[54] NOVELTY YARN PRODUCTION

[75] Inventors: Joe F. London, Jr., Greensboro; Charles D. Pugh, Raleigh, both of N.C.

[73] Assignee: Burlington Industries, Inc., Greensboro, N.C.

[21] Appl. No.: 464,045

[22] Filed: Feb. 4, 1983

Related U.S. Patent Documents

Reissue of:

[64] Patent No.: 4,311,000
Issued: Jan. 19, 1982
Appl. No.: 71,027
Filed: Aug. 29, 1979

[51] Int. Cl.[3] ..... D02G 1/16; D02G 3/36

[52] U.S. Cl. ..... 57/6; 28/258; 28/271; 57/91; 57/207; 57/208; 57/350

[58] Field of Search ..... 57/6, 12, 91, 350, 205–208, 57/908; 28/163, 258, 271–276

[56] References Cited

U.S. PATENT DOCUMENTS

| | | | |
|---|---|---|---|
| Re. 27,717 | 8/1973 | Breen et al. | 57/350 X |
| 1,997,771 | 4/1935 | McGowan | 57/207 |
| 3,041,812 | 7/1962 | Marshall | 57/6 |
| 3,091,909 | 6/1963 | Taylor et al. | 57/91 |
| 3,113,413 | 12/1963 | Jacobs et al. | 57/350 |
| 3,144,747 | 8/1964 | Palm et al. | 57/6 |
| 3,217,482 | 11/1965 | Baer | 57/6 |
| 3,296,785 | 1/1967 | Hardy | 57/6 X |
| 3,457,715 | 7/1969 | Eldridge et al. | 57/6 |
| 3,517,498 | 6/1970 | Burellier et al. | 57/91 |
| 3,748,648 | 7/1973 | Pugh | 28/252 X |
| 3,756,005 | 9/1973 | Seguin | 57/91 X |
| 3,812,665 | 5/1974 | Holland | 57/6 |
| 3,812,668 | 5/1974 | Wilson | 57/6 |
| 3,854,313 | 12/1974 | Heichlinger et al. | 57/350 X |
| 3,911,655 | 10/1975 | London, Jr. et al. | 28/271 X |
| 3,918,244 | 11/1975 | Drummond | 57/6 |
| 4,010,523 | 3/1977 | Hense et al. | 28/274 X |
| 4,064,686 | 12/1977 | Whitted et al. | 57/205 X |
| 4,080,777 | 3/1978 | Griset, Jr. | 57/208 |

*Primary Examiner*—John Petrakes
*Attorney, Agent, or Firm*—Cushman, Darby & Cushman

[57] ABSTRACT

A method and apparatus for producing novelty yarn with an unusual configuration. An effect yarn is fed to a novelty yarn jet, and a core yarn is fed to a different yarn port in the same jet, the core yarn being maintained substantially taut. The combined core and effect novelty yarn is taken up from the jet and periodically (preferably pseudo-randomly) a pronounced variation in linear density is provided in the combined yarn. This linear density variation is accomplished by introducing a first fluid pulse into the jet at a first position to form a loop in the effect yarn, which loop extends substantially coincident with a portion of the core yarn, and then utilizing a second fluid pulse at a spaced position from the first pulse to impart a spiraling and/or rotating action to the loop of effect yarn to wind the effect yarn around the core yarn. Separate valves are associated with the fluid ports in the jet, and a numerical controller may be utilized for controlling the operation of the valves to produce the variations in linear density. The final novelty appearance of yarn and fabric from it is generated by backwinding and/or weaving the yarn from the take-up package.

12 Claims, 10 Drawing Figures

NOVELTY YARN PRODUCTION

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to a method and apparatus for producing unusual novelty yarns. Novelty yarns are yarns having pronounced variations in linear density, such as knops, loops, slubs, lumps, or the like, and such yarns are useful in the formation of a wide variety of decorative fabrics and materials. A wide variety of methods and apparatus are presently employed for making novelty yarns, among them being those utilizing one or more yarn treating jets and separate mechanisms for selectively controlling tension on an effect yarn, such as shown in U.S. Pat. Nos. 3,091,909; 3,854,313; and 4,010,523. The action may be accomplished in two distinct stages using spaced apparatus, although U.S. Pat. No. 3,517,498 suggests accomplishing its action by feeding effect and core yarns separately into a suction and turbulence device for simultaneously exercising a suction and turbulence on the effect thread before it exits the device.

According to the present invention, a method and apparatus are provided for producing an unusual novelty yarn utilizing a simple but effective apparatus, the apparatus being precisely controllable to obtain the desired results utilizing a single structure in which an effect yarn is operated upon and disposed around a core yarn.

According to the present invention, an apparatus is provided for producing novelty yarn which comprises a novelty-yarn jet; means for overfeeding an effect yarn to the jet; means for feeding a core yarn to the jet; and means for taking up a combined core and effect novelty yarn from the jet. Additionally, fluid introduction means are provided for introducing fluid into the jet for effecting pronounced changes in linear density of the novelty yarn, valve means are provided for controlling the introduction of fluid to the fluid introduction means, and control means are provided for controlling the valve means to pseudo-randomly produce pronounced changes in linear density in the combined yarn by maintaining the core yarn substantially taut while sequentially forming a loop around the core yarn. The novelty-yarn jet comprises a body member having a first yarn port for the introduction of a core yarn, a second yarn port for the introduction of an effect yarn, and a third yarn port for the passage of a combined yarn from the body member. A first fluid introduction port is also formed in the body member in operative communication with the second yarn port, and a second fluid introduction port is formed in the body member in operative communication with at least one of the yarn ports. Valve means are provided for controlling the supply of fluid to the first and second fluid introduction ports to cause fluid to be introduced thereinto to produce a novelty yarn by acting upon at least the effect yarn. The second yarn port is substantially in-line with the first yarn port, a common passageway being provided, and the third yarn port is substantially transverse to the common passageway, all of the yarn ports being in operative communication in said common passageway within the body member. Both fluid introduction ports are disposed at a angle greater than 1° and less than 90° with respect to the common passageway, and the second fluid port is generally tangential with respect to the common passageway.

According to the method of the present invention, novelty yarn is produced having pronounced variations in linear density disposed at spaced points therealong utilizing a jet. The method comprises the steps of overfeeding an effect yarn to the jet, feeding a core yarn to the jet (the core yarn being maintained substantially taut), and taking up a combined core and effect novelty yarn from the jet. Periodically, a loop is formed in the effect yarn extending substantially coincident with a portion of the core yarn and then subsequently a spiraling and/or rotating action is imparted to the loop of effect yarn to wind the effect yarn around the core yarn. The loop formation and spiraling impartation steps are practiced utilizing downwardly directing fluid streams at spaced positions along the jet. The core and effect yarns are fed to separate yarn ports in the jet, and the combined novelty yarn is withdrawn from a third yarn port substantially transverse to a common passageway in-line with the first and second yarn ports.

It is the primary object of the present invention to make attractive and salable novelty yarns and fabrics utilizing advanced competitive processes and apparatus. This and other objects of the invention will become clear from an inspection of the detailed description of the drawings and from the appended claims.

DETAILED DESCRIPTION OF THE DRAWINGS

Figure 1:
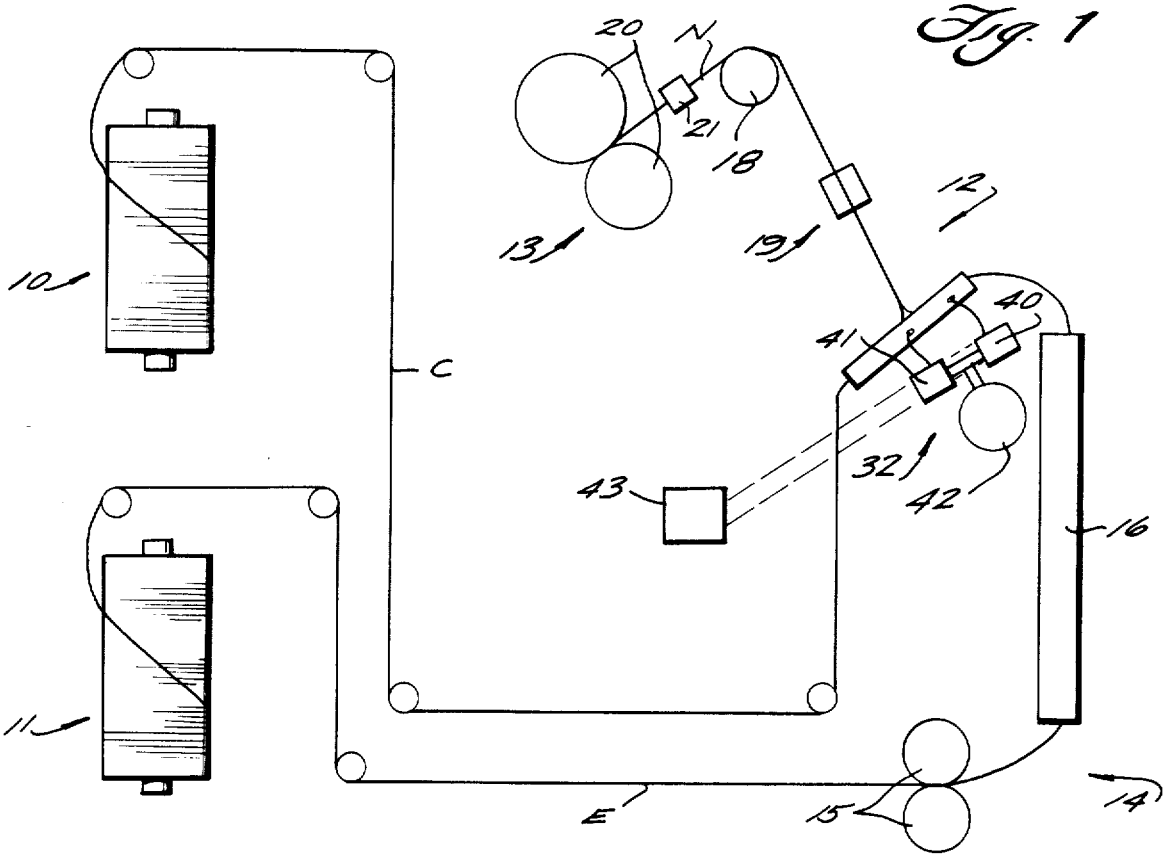
FIG. 1 is a schematic view illustrating exemplary apparatus for practicing the present invention.

The exemplary apparatus for practicing the present invention is illustrated schematically in FIG. 1, and includes a feed spool 10 of core yarn C, and a feed spool 11 of effect yarn E, a novelty yarn jet 12, and a take-up mechanism 13 for the combined core and effect novelty yarn N. Means 14 are provided for intermittently overfeeding the effect yarn E to the jet 12, such as the feed rollers 15 and a loose yarn storage zone 16. Means are also provided for feeding the core yarn C to the jet 12, such as the feed roller 18 located downstream of the jet 12. A suitable tensioning mechanism 19 may be provided downstream of the jet 12 for maintaining the tension of the core yarn C, and an optional interlacing jet 21 gives added coherence to the yarn between the effect zones to improve weavability. The take-up means 13 may comprise a conventional yarn spool take-up assembly 20.

The jet 12 according to the present invention is shown in more detail in FIGS. 2, 3, and 5a–5c. The jet 12 includes a body member 25, of plastic, metal, or the like, preferably of brass, having a first yarn port 26 for the introduction of the core yarn C, a second yarn port 27 for the introduction of the effect yarn E, and a third port 28 for the passage of the novelty yarn N from the jet 12. A first fluid introduction port 29 is formed in the body in operative communication with the second port 27, and a second fluid introduction port 30 is formed in the body member 25 in operative communication with at least one of the yarn ports 26–28. Valve means 32 are provided for controlling the supply of fluid to the fluid introduction ports 29, 30 to cause the fluid to be periodically introduced thereinto to produce the novelty yarn by acting on at least the effect yarn E.

As illustrated in the drawings, preferably the first and second yarn ports 26, 27 are substantially in-line, a common passageway 26, 27 being provided with the passageway having a first diameter D (see FIG. 3) between the second yarn port 27 and just before the third yarn port 28, and having a second, larger diameter D′ between the third yarn port 28 and the first yarn port 26. The third yarn port 28 is substantially transverse to the common passageway 26, 27 with all of the yarn ports being in operative communication in the common passageway within the body member 25.

As seen most clearly in FIGS. 2, 3, and 5a–5c, each of the fluid introduction ports 29, 30 makes an angle of greater than 1° and less than 90° with respect to the common passageway 26, 27, the first fluid port 29 intersecting the common passageway between the second yarn port and the third yarn port, and the second fluid introduction port 30 intersecting the common passageway between the third yarn port and the first yarn port. The angle may preferably be chosen to be [aprroximately] *approximately* 70°. As can be seen from FIG. 2, the second fluid introduction port 30 also is preferably tangential with respect to the common passageway 26, 27 to impart a spiraling and/or rotating action to the effect yarn when supplied with fluid, and a plane containing the ports 29, 30 is substantially perpendicular to the third yarn port 28. In use, the body member 25 of the jet may be so oriented (see FIGS. 5a–5c) that the air introduced into the ports 29, 30 is angled downwardly.

Figure 4:
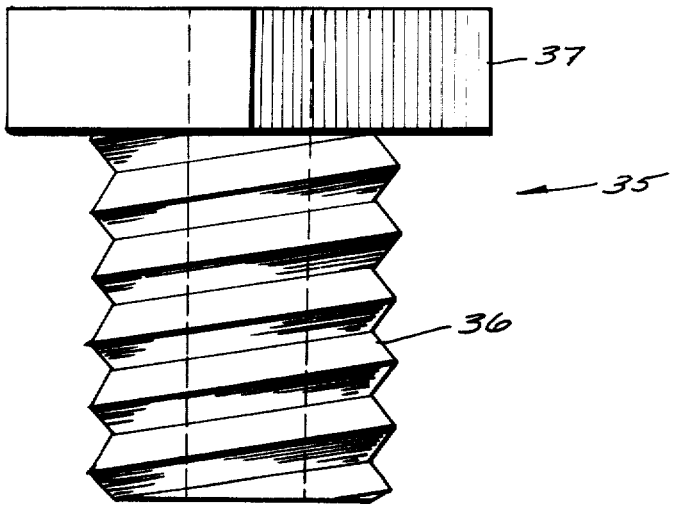
FIG. 4 is a side detailed view of a threaded insert utilizable with one of the yarn ports of the jet of FIGS. 2 and 3.
Figure 2:
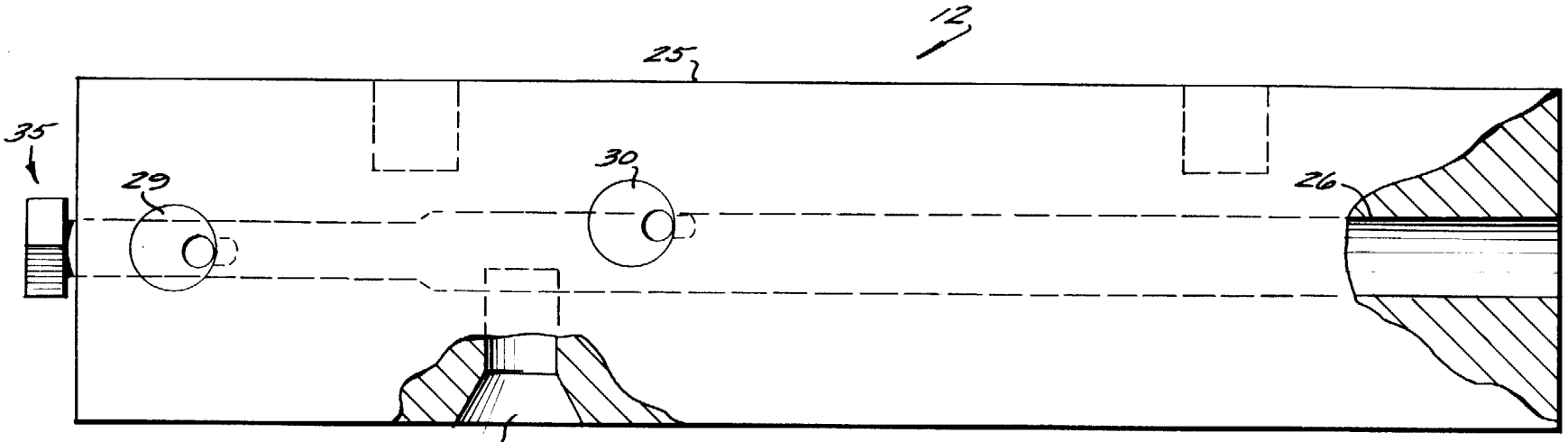
FIGS. 2 and 3 are top and side views, partly in cross-section and partly in elevation, respectively, of an exemplary novelty yarn jet utilizable in FIG. 1.
Figure 3:
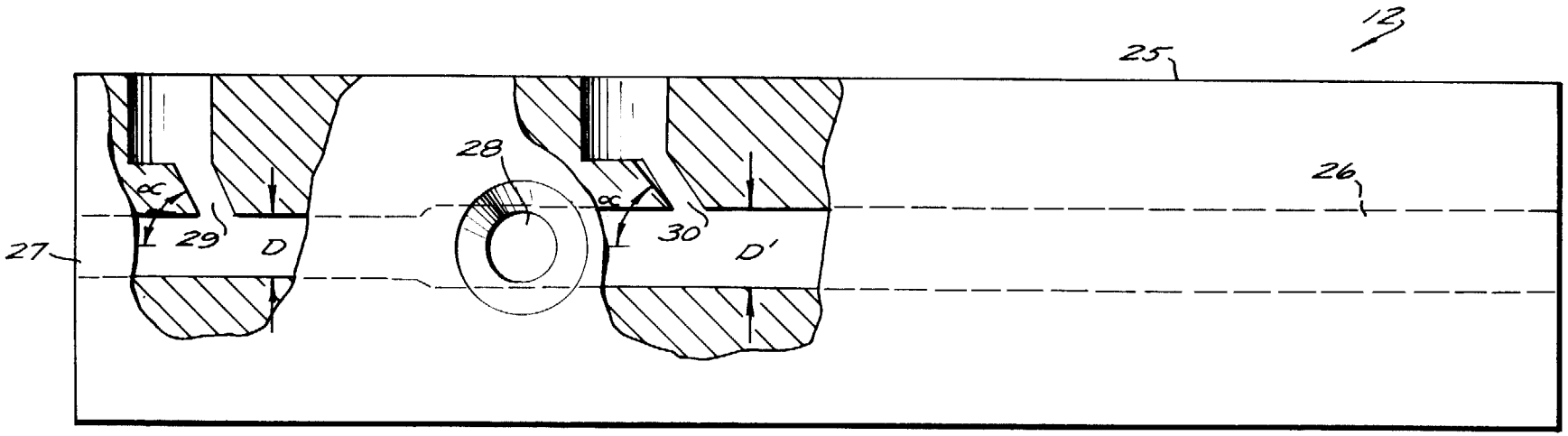

The yarn ports 26–28 preferably include conventional ceramic liner inserts, such as the insert 35 illustrated in FIGS. 2 and 4, including a threaded body member 36 for engaging the threaded interior of the body 25, a through-passageway being provided in the insert 35. Non-threaded inserts also are useful.

The valve means 32 for supplying fluid (preferably compressed air) to the ports 29, 30 preferably comprises two distinct valves 40, 41. The valves are in operative communication with a source of compressed air 42, and preferably are operated by a conventional numerical controller (illustrated schematically at 43 in FIG. 1), which pseudo-randomly controls the valves 40, 41 to provide pseudo-random spacing between pronounced variations in linear density of the novelty yarn N. The numerical controller 43 may be any suitable conventional type such as shown in U.S. Pat. No. 3,748,648, the disclosure of which is hereby incorporated by reference herein.

Particularly when the open spaces between novelty sectors are relatively long, for example, 6–200 inches, it is generally desirable to apply twist or interlacing to the yarns, such as by interlacing jet 21, before windup. The jet described in U.S. Pat. No. 3,911,655 is particularly advantageous, though other interlacing jets may be utilized. The purpose of this jet is principally to improve the weaving performance of the between-novelty sectors of the yarn.

Figure 5A:
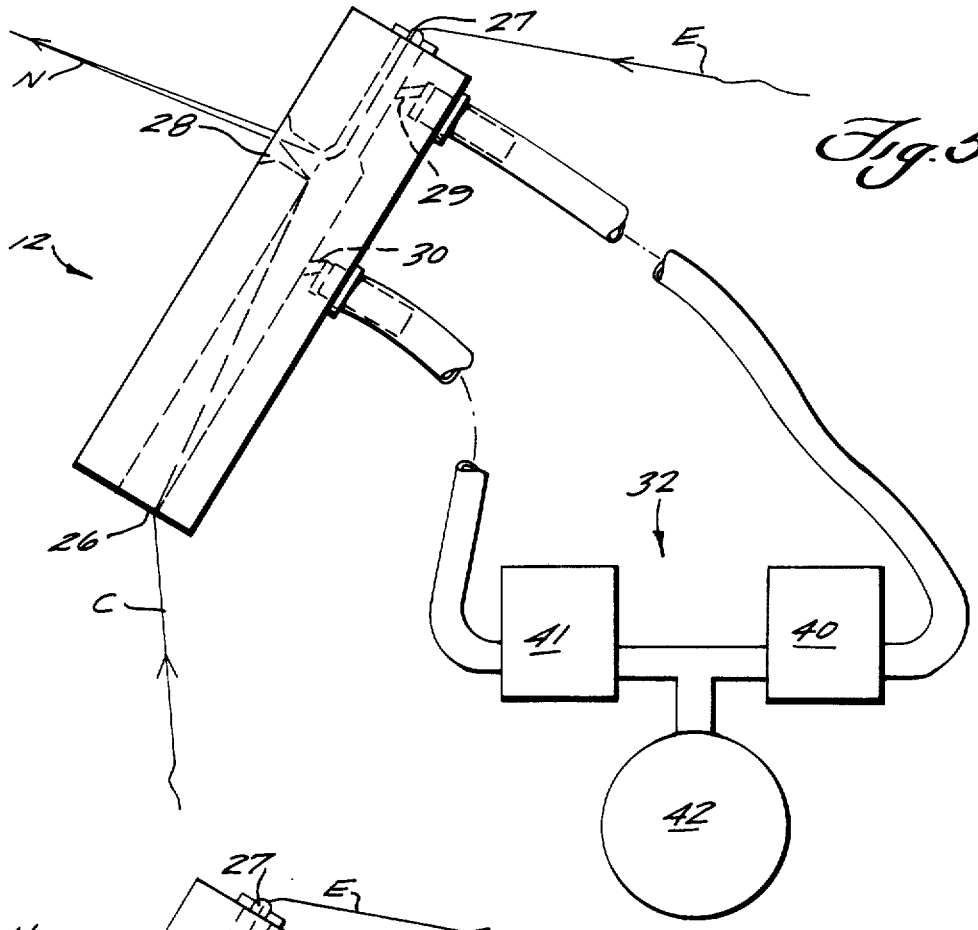
FIGS. 5a–5c schematically illustrate the sequence of operation in practicing the method according to the present invention to produce a desired novelty yarn.
Figure 5B:
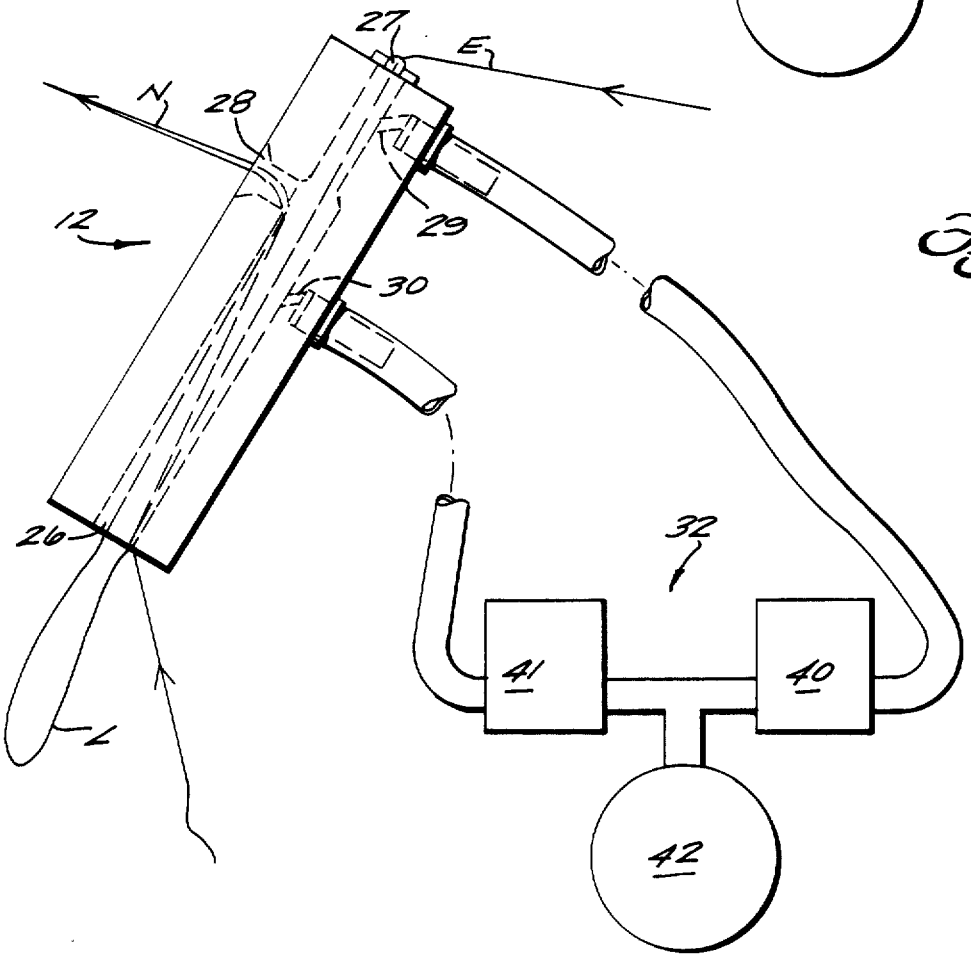
Figure 5C:
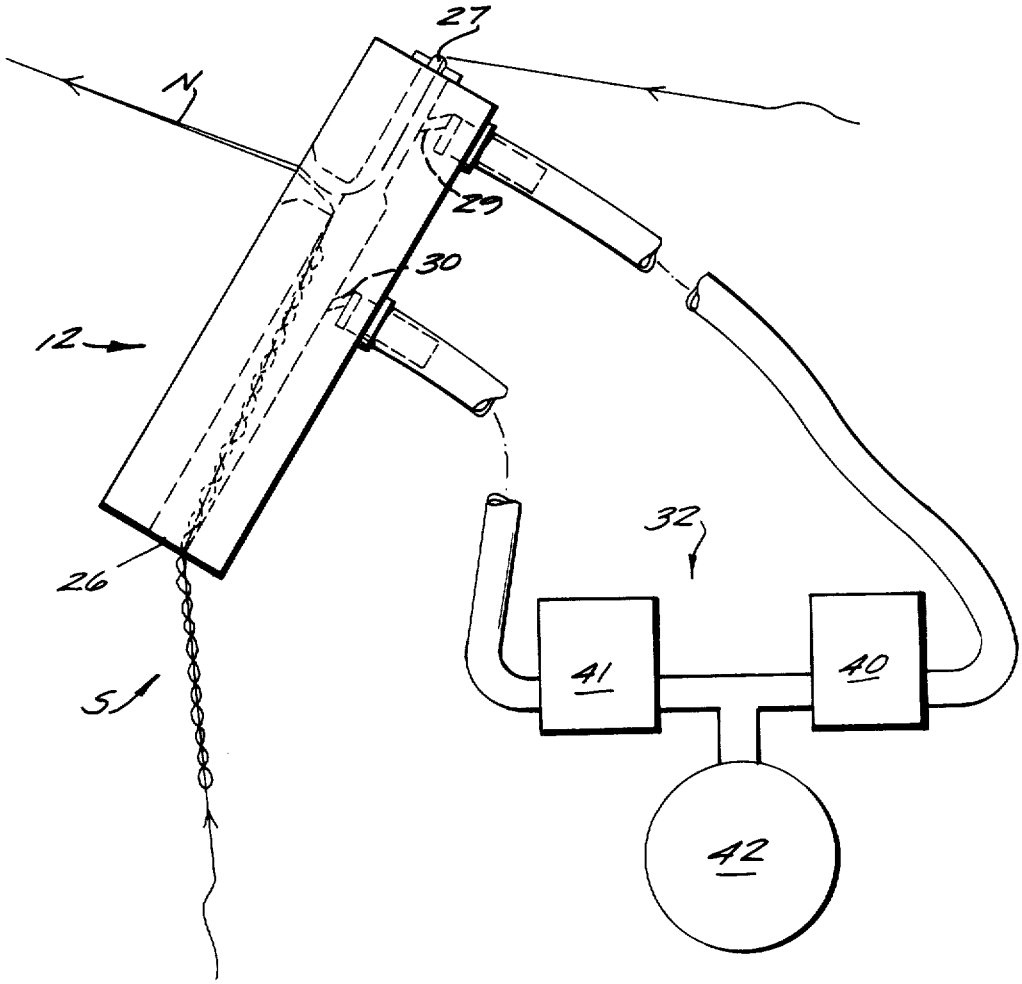

The method of operation of the apparatus to produce novelty yarn according to the present invention is seen most clearly with respect to FIGS. 5a–5c. Between novelty sectors, the effect yarn E is drawn from storage zone 16 to the jet 12 while the core yarn C is fed to the jet 12 while being maintained substantially taut. The effect yarn E passes into second yarn port 27 and out through third yarn port 28, and is combined with the core yarn C which passes into first yarn port 26 and then out through third yarn port 28. Periodically (e.g. pseudo-randomly) a pronounced variation in linear density is provided in the combined novelty yarn N by the operation of the valves 40, 41 for introducing air under pressure at the spaced fluid introduction ports 29, 30 in the jet 12. Between introductions of novelty sectors, both the valves 40, 41 are maintained closed.

When a pronounced variation in linear density is to be introduced into the yarn, the controller 43 opens valve 40 so that compressed air flows from source 42 to first fluid introduction port 29 and acts upon the effect yarn E to form a loop L (FIG. 5b) substantially coincident with a portion of the core yarn C. The loop L extends in the common passageway 26, 27 past the third yarn port, and may be long enough so that it extends outwardly of the body member 25, although the length of the body member 25 and the duration and/or pressure of the air pulse provided by the port 29 may equally well be selected so that the loop L does not extend outwardly of the body 25. During this portion of the process the valve 41 is maintained closed.

After a pressure pulse is provided through the port 29, the valve 40 is closed by the controller 43, and simultaneously with or essentially immediately after the programmed shut-off of the valve 40, the controller opens the valve 41 to provide a pulse of compressed air through the second fluid introduction port 30. Because of the tangential disposition of the port 30 with respect to the common passageway 26, 27, the fluid pulse from that port imparts a spiraling and/or rotating action to the loop L of effect yarn to wind the effect yarn around the core yarn C, as illustrated at S in FIG. 5c. After a pressure pulsation of the desired duration, the valve 41 is then also closed by the controller 43, and the between novelty zones operation of the jet 12 illustrated in FIG. 5a is continued.

Preferably, both the core C and effect E yarns are multifilament yarns, and any continuous filament yarn, textured or non-textured, may be used (such as nylon 6 or 66, polyester, rayon, acetate, or Qiana). Any degree of twist is tolerable in the core yarn although loose to zero twist is preferred to permit at least some degree of intermingling of the yarns in the non-novelty sectors of the product yarn. A combination of spun (including cotton) and continuous yarn may also be utilized with either the spun or continuous yarn as a core. One hundred [precent] *percent* continuous core and effect yarns, straight or false-twisted textured, are preferred, especially lightly-interlaced core, and no-twist effect, yarns, both of textured polyester. Lightly-interlaced yarns may be produced by conventional processes such as that of U.S. Pat. No. 3,911,655.

The novelty zones may be programmed ¼-inch to 6 inches in length with ½-inch to 4-inch lengths preferred, and the majority being 1 to 3 inches. Spacing between the novelty zones may be as little as 12 inches with 54 to 200-inch spacings preferred in some end uses, and with the spacings being made pseudo-randomly by the controller 43. Still closer spacing, if densely-spaced novelty zones are desired, is entirely within the capabilities of the invention.

While preferred apparatus for feeding the yarns to and from the jet 12 have been illustrated in FIG. 1, other conventional equivalent apparatus may be utilized, such as low pressure air jets for feeding the yarn to the intermingling jet 12.

The final structure and appearance of the yarns and fabrics of the invention are not achieved until the yarn as it goes to take-up is backwound to another package and/or woven into fabric. As it goes onto the take-up package (13) each novelty zone essentially comprises the elongated loop of effect yarn spiraled around the core yarn, with no more than a trivial amount of tail-end tangling where the spiral has sometimes unwound slightly at its trailing end, particularly when put through the interlacing jet 21. For the most part, however, the interlacing jet 21 has virtually no effect upon the spiral novelty zone. When the take-up package is complete, the yarn is severed (between 21 and 13) and from the take-up package, the yarn is backwound to a separate package or, alternatively, is woven into fabric directly from the take-up package. In either event, the drag imparted to what was formerly the trailing end of the novelty zone, and now is the leading end, causes the end of the spiral to be loosened and pushed up into the distinctive large tangle (T), as well as less consistently to develop additional smaller entanglement zones along the spiral (t).

Additional structural shifts within the novelty zone of the yarn are to be expected when the yarn is backwound before weaving. The original trailing end of the spiral becomes the leading end in backwinding, and again becomes the trailing end in weaving, with drag effects on the yarn accompanying each change of direction. It is for this reason that fabric made from a backwound yarn may not be mergible with that made from the same yarn woven directly from the take-up package.

Figure 6:
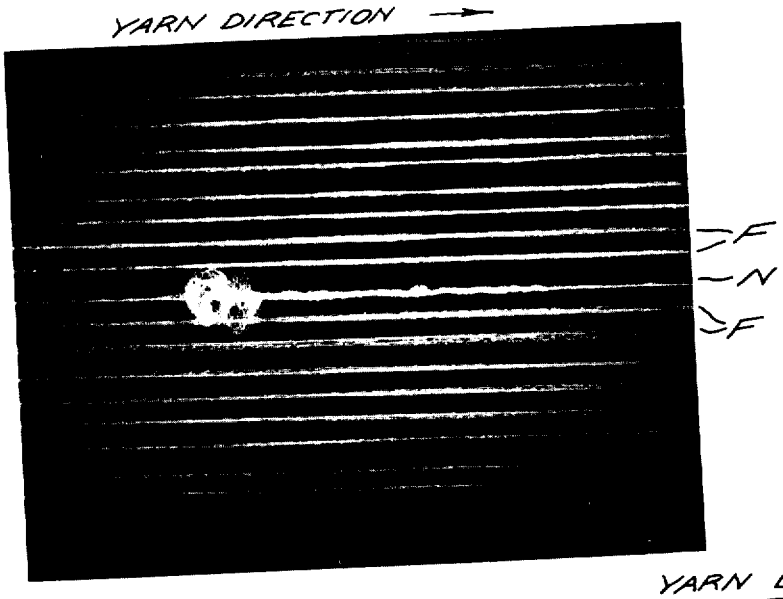
FIG. 6 is a photograph illustrating a pronounced variation in linear density provided on yarn in practicing the present invention, illustrated in comparison to conventional yarns.
Figure 7:
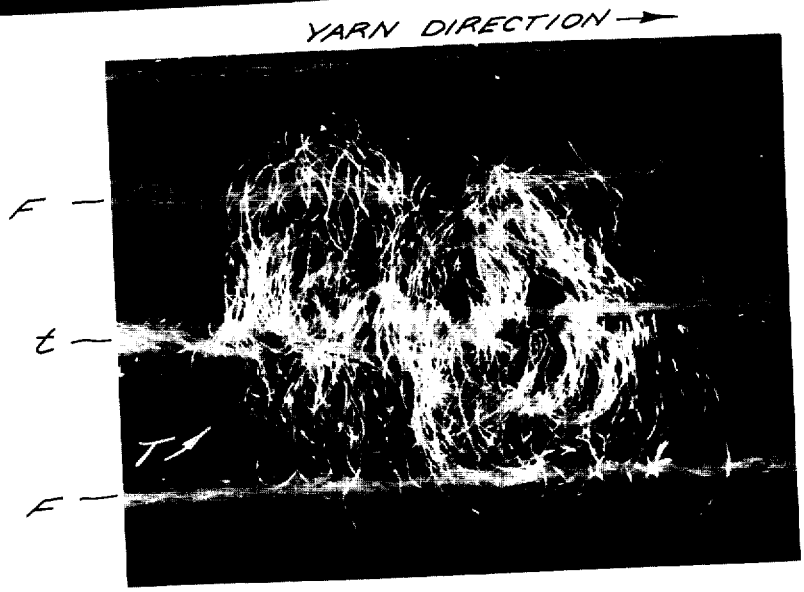
FIGS. 7 and 8 are photographs illustrating details of the "tangle" and "tail", respectively, of the pronounced variation in linear density of the novelty yarn of FIG. 6.
Figure 8:
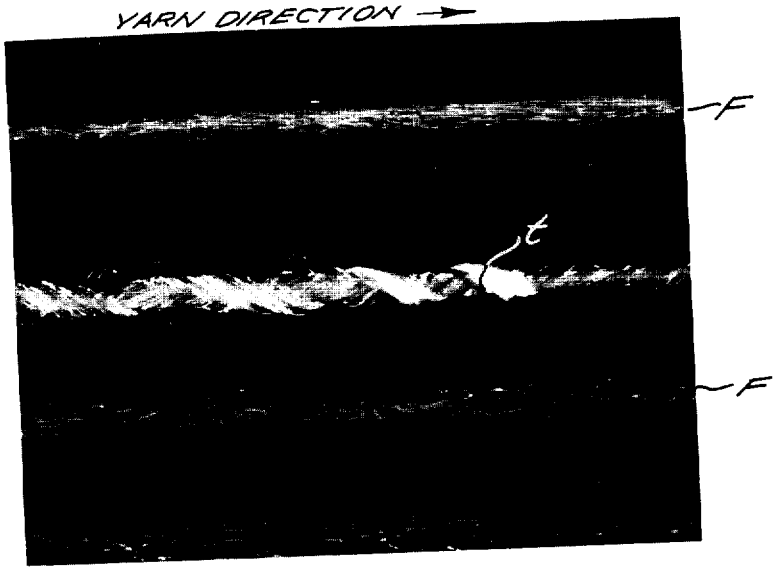

The unusual yarn produced according to the present invention is illustrated in FIGS. 6–8. In the illustration of FIGS. 6–8, the novelty zone N has been formed by core and effect yarns that are both multifilament. The novelty zone N is illustrated side-by-side with between-zone sectors F.

As seen most clearly in FIG. 7, the novelty yarn according to the invention has a tangle T disposed along a core section with a long "tail" t extending from the tangle T to the nonnovelty body of the yarn. The "tail" t in fact terminates in the tangle T, and sometimes secondary entanglements may be found along the "tail" t. Generally, the longer the initial surge of air through port 29 (and thus the larger the loop L of effect yarn) the greater the tendency toward secondary entangled zones T in the "tail" t.

It will thus be seen that according to the present invention a method and apparatus for producing an unusual novelty yarn have been provided which produce the desired product in a simple and effective manner utilizing a minimum of simply controlled structures.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods, products, and apparatus.

What is claimed is:

1. A jet for producing novelty yarn comprising a body member;

a first yarn port in said body member for the introduction of a core yarn;

a second yarn port in said body member for the introduction of an effect yarn, said second yarn port being substantially in-line with said first yarn port, a common passageway being provided;

a third yarn port in said body member for the passage of a combined yarn comprising the combined effect and core yarns, said third yarn [being substantially transverse to] *port intersecting* said common passageway, all of said yarn ports being in operative communication in said common passageway within said body member;

a first fluid introduction port formed in said body member and in operative communication with said second yarn port;

a second fluid introduction port formed in said body member and in operative communication with at least one of said yarn posts; and valve means for controlling the supply of fluid to said first and second fluid introduction ports to cause fluid to be introduced thereinto to produce a novelty yarn by acting upon at least said effect yarn.

2. A jet as recited in claim 1 wherein said first fluid introduction port is disposed at an angle greater than 1° and less than 90° with respect to said common passageway, and intersects said common passageway between said second yarn port and said third yarn port.

3. A jet as recited in claim 2 wherein said second fluid introduction port is disposed at an angle greater than 1° and less than 90° with respect to said common passageway, and intersects said common passageway between said third yarn port and said second yarn port.

4. A jet as recited in claim 3 wherein said second fluid introduction port is generally tangential with respect to said common passageway.

5. A jet as recited in claim 3 wherein each of said fluid introduction ports makes an angle of about 70° with respect to said common passageway.

6. A jet as recited in claims 1 or 3 wherein said common passageway has a first diameter from said second yarn port to just before said third yarn port, and has a second diameter from just before said third yarn port to said first yarn port, said second diameter being larger than said first diameter.

7. A jet as recited in claim 1 wherein said yarn ports include ceramic liner inserts.

8. A jet as recited in claim 1 wherein said fluid introduction ports are disposed in a common plane substantially transverse to said third yarn port.

9. A jet as recited in claim 1 further comprising a numerical controller for controlling said valve means pseudo-randomly to provide pseudo-random spacing between pronounced variations in linear density of said combined yarn.

*10. A jet as recited in claim 9 further comprising means for intermittently over-feeding an effect yarn to said second yarn port.*

*11. A jet as recited in claim 1 further comprising means*

*for intermittently over-feeding an effect yarn to said second yarn port.*

*12. A jet as recited in claim 3 further comprising means for intermittently over-feeding an effect yarn to said second yarn port.*

* * * * *